United States Patent [19]

Naruse et al.

[11] 4,247,407

[45] Jan. 27, 1981

[54] MAGNETIC RECORDING COMPOSITION

[75] Inventors: Tunehide Naruse; Manabu Habu; Makoto Kato, all of Yokohama, Japan

[73] Assignee: Victor Company of Japan, Limited, Yokohama, Japan

[21] Appl. No.: 32,230

[22] Filed: Apr. 23, 1979

[30] Foreign Application Priority Data

Apr. 24, 1978 [JP]  Japan .................................. 53-47874

[51] Int. Cl.³ .......................... B05D 5/12; B32B 9/04; C04B 35/04
[52] U.S. Cl. ................. 252/62.54; 427/128; 428/539
[58] Field of Search .......................... 252/62.51, 62.54; 427/128; 428/539

[56] References Cited

U.S. PATENT DOCUMENTS

| | | | |
|---|---|---|---|
| 3,492,235 | 1/1970 | Matsumoto et al. | 204/62.54 |
| 3,704,152 | 11/1972 | Hartmann et al. | 204/62.54 X |
| 3,790,407 | 2/1974 | Merten et al. | 204/62.54 X |
| 4,002,804 | 1/1977 | Akashi et al. | 428/539 |

*Primary Examiner*—F. C. Edmundson
*Attorney, Agent, or Firm*—Lowe, King, Price & Becker

[57] ABSTRACT

A magnetic recording composition comprising, in solvent, a magnetic powder, a resinous binder and, as a lubricant, an ester of isostearyl alcohol and a monobasic fatty acid containing from 6 to 16 carbon atoms or cetyl isooctanoate contained in an amount of 0.5 to 20 wt % of the binder. The composition can further comprise triolein as another lubricant component in an amount of 0.5 to 10 wt % of the binder, the total amount of the ester and triolein being in the range of 1 to 20 wt % of the binder.

13 Claims, No Drawings

MAGNETIC RECORDING COMPOSITION

This invention relates to a magnetic recording art and more particularly, to a magnetic recording composition using a specific type of lubricant.

As is well known, magnetic recording compositions which are used to make magnetic recording media in the form of tapes, sheets and discs are required, when applied as a magnetic layer of such medium, to show not only excellent magnetic and electric characteristics, but also desirable properties such as small surface abrasion resistance, excellent still picture characteristics and small abrasion loss of recording and reproducing heads. To satisfy the above requirement, a number of lubricants are known and incorporated in the magnetic recording composition. For example, there have been practically employed, as lubricant, esters of fatty acids such as propyl monostearate, amyl stearate, tearyl butyrate and the like, natural oils and fats, various fatty acids, and solid lubricants. However, these known lubricants have disadvantages which follows. That is, the natural oils and fats in most cases contain impurities which will give an adverse influence of lubrication on the final magnetic medium, coupled with another disadvantage that such oils and fats have to be used in large amount since they are relatively small in content of effective lubricant components. Accordingly, the magnetic layer formed from the magnetic composition using those oils and fats disadvantageously assumes an adhesive or sticky tendency, leading to clogging of the recording and reproducing heads.

Conventionally employed fatty acids and their acids have also drawbacks of blooming, exudation and unstability in oxidation. Further, solid lubricants such as molybdenum disulfide, graphite and the like are disadvantageous in that they serve to lower the packing density of magnetic powder and thus can not be added in large amount, and are apt to cause the head clogging.

It is accordingly an object of the present invention to provide a magnetic recording composition using a specific type of lubricant which overcomes the disadvantages of the known lubricants.

It is another object of the present invention to provide a magnetic recording composition capable of forming a magnetic layer which is remarkably improved in the surface abrasion resistance, still picture characteristics and abrasion loss of head.

It is a further object of the present invention to provide a magnetic recording composition which shows, when applied as recording media, an excellent lubricating effect without involving any head clogging.

It is a still further object of the present invention to provide a magnetic recording composition which can yield magnetic recording media which stand repeated use without any significant lowering of reproduction output level.

The above objects can be achieved, according to the present invention, by a magnetic recording composition which comprises, in solvent, 15 to 90 wt% of a magnetic powder, correspondingly 35 to 10 wt% of a resinous binder, and a lubricant selected from the group consisting of esters of isostearyl alcohol and monobasic fatty acids having 6 to 16 carbon atoms and cetyl isooctanoate, the lubricant being contained in an amount of 0.5 to 20 wt% of the binder.

In order to further improve the lubricating properties of the magnetic layer of a recording medium formed from the composition and also to completely suppress the so-called stick-slip phenomenon as might happen to occur in the case of the above-indicated composition, the composition can further comprise triolein in an amount of 0.5 to 10 wt% of the binder, the total amount of the ester and triolein being in the range of 1 to 20 wt% of the binder.

The present invention will be described in detail.

The magnetic materials or powders useful in the present invention may be any of conventionally employed ones for the magnetic recording purpose and include, for example, $\gamma\text{-Fe}_2\text{O}_3$, $\text{Co-}\gamma\text{-Fe}_2\text{O}_3$, $\text{Co-Fe}_3\text{O}_4$ and the like.

The useful resinous binders are known two-component systems including a polyisocyanate as one component and, as the other component, resins or elastomers such as polyvinyl alcohol-containing vinyl chloride-vinyl acetate copolymer, polyurethane elastomer, polyester, polyol, phenoxy resin and the like. Further, vinyl chloride-vinyl acetate copolymer which is not reactive with the polyisocyanate is preferable as the binder when used in combination with a polyisocyanate and/or an elastomer or resin such as a thermoplastic saturated polyester resin or nitrile rubber. Examples of the polyisocyanate useful for the purpose are a reaction product of 3 moles of 2,4-tolylenediisocyanate and 1 mole of trimethylolpropane (available under the name of Coronate L from Nippon Polyurethane Co., Ltd.), 2,4-tolylenediisocyanate, 2,6-tolylenediisocyanate, hexamethylenediisocyanate, a reaction product of 3 moles of hexamethylenediisocyanate and 1 mole of trimethylolpropane and the like.

The magnetic powder and the binder are generally used in amounts of 15 to 90 wt% and correspondingly 35 to 10 wt%, respectively, as mentioned hereinbefore.

According to an important aspect of the invention, the composition comprises, as a lubricant, esters of isostearyl alcohol and monobasic fatty acids having 6 to 16 carbon atoms or cetyl isoctanoate.

The monobasic fatty acids are preferably saturated ones including caproic acid, enanthic acid, caprylic acid, pelargonic acid, capric acid, undecylic acid, lauric acid, tridecylic acid, myristic acid, pentadecylic acid, and palmitic acid.

Preferable esters are, for example, isostearyl caprylate, isostearyl caproate, isostearyl laurate, isostearyl palmitate, isostearyl myristate, and cetyl isooctanoate.

The amount of the esters is conveniently in the range of 0.5 to 20 wt% based on the binder employed. Preferably, the amount is in the range of 5 to 10 wt% of the binder in view of a fact that the magnetic medium using the ester within the above-defined range is more excellent in surface lubricating characteristics such as abrasion resistance and abrasion loss of head and is small in lowering of reproduction output level.

Larger amount is undesirable since the magnetic layer is exuded with the lubricant to a degree and becomes sticky, so that the lubricating effect can not be expected at all with the attendant clogging or recording and reproducing heads. On the contrary, less amount will not show any satisfactory level of improved properties of lubrication as will be expected.

In order to further improve the lubricating properties of the magnetic surface layer, triolein is added to the composition as another component of lubricant in an amount of 0.5 to 10 wt% of the binder, provided that the total amount of the ester and triolein is in the range of 1.0 to 20 wt% of the binder.

The addition of triolein is especially effective in suppressing the so-called stick-slip henomenon of a magnetic recording medium occurring during its reproduction operation. This phenomenon will be sometimes experienced with the case where the esters of isostearyl alcohol and the monobasic fatty acids are used singly as the lubricant.

Preferable combinations of the esters and triolein include, for example, those of triolein and cetyl isooctanoate, isostearyl caproate and isostearyl myristate.

In practice, the magnetic recording composition can be readily prepared by mixing the magnetic powder, binder and lubricant, and, if necessary, other additives in desired mixing ratios in an organic solvent by a suitable means such as a sand mill. The thus prepared composition is then applied onto, for example, a sheetlike substrate such as a plastic resin film by any of known techniques. The applied sheet is surface calendered to obtain a magnetic recording sheet. As an example of the organic solvent, there is suitably used a mixed solvent of methyl ethyl ketone, methyl isobutyl ketone and toluene though any other known solvent systems capable of dissolving the binder may be likewise used.

As a matter of course, additives such as a dispersant, crosslinking agent and the like may be added to the composition.

If necessary, other known lubricants may be used in combination with the lubricant used in the composition of the invention to impart to the magnetic surface layer of a recording medium other desirable properties inherent to the known lubricant.

The present invention will be particularly described by way of the following examples. Comparative examples are also provided to facilitate the better understanding of excellency of the invention.

EXAMPLE 1

| | |
|---|---|
| $\gamma$-Fe$_2$O$_3$ | 100 parts by weight |
| Binder composed of a mixture of vinyl chloride-vinyl acetate copolymer and polyurethane elastomer | 20 parts by weight |
| Dispersant of soybean lecithin | 1 part by weight |
| Mixed solvent of toluene, methyl ethyl ketone and methyl isobutyl ketone in equal amounts | 250 parts by weight |
| Isostearyl caproate as a lubricant for magnetic recording | different amount below 4 parts by weight |

The compositions of the above formulations using different amounts of the lubricant within and outside the range of amount defined hereinbefore were prepared by mixing and dispersing in a suitable means. Each composition was applied onto a 21$\mu$ thick polyester film substrate and, after drying, surface-calendered. This film was then slit into ¾ inch wide reeled tapes for magnetic video recording.

EXAMPLE 2

Example 1 was repeated using isostearyl caprylate instead of isostearyl caproate thereby obtaining magnetic tapes for video recording.

EXAMPLE 3

Example 1 was repeated using isostearyl laurate instead of isostearyl caproate thereby obtaining magnetic tapes for video recording.

EXAMPLE 4

Example 1 was repeated using isostearyl palmitate instead of isostearyl caproate thereby obtaining magnetic tapes for video recording.

EXAMPLE 5

Example 1 was repeated using isostearyl myristate in amounts of up to 6 parts by weight instead of isostearyl caproate thereby obtaining magnetic tapes for video recording.

EXAMPLE 6

Example 1 was repeated using up to 5 parts by weight of cetyl isooctanoate instead of isostearyl caproate and 1.5 parts by weight of the soybean lecithin thereby obtaining magnetic tapes for video recording.

EXAMPLE 7

| | |
|---|---|
| Co-Fe$_3$O$_4$ | 100 parts by weight |
| Binder composed of a mixture of polyvinyl alcohol-containing vinyl chloride-vinyl acetate copolymer and polyurethane elastomer | 20 parts by weight |
| Crosslinking agent composed of polyisocyanate | 2 parts by weight |
| Dispersant of soybean lecithin | 1 part by weight |
| Mixed solvent of methyl ethyl ketone, methyl isobutyl ketone and toluene | 250 parts by weight |
| Isostearyl myristate as a lubricant for magnetic recording | different amounts below 6 parts by weight |

The compositions of the above formulations were used to make magnetic tapes for video recording in the same manner as in Example 1. Each tape was allowed to stand in an atmosphere of 60° C. for 48 hours so as to make the crosslinking reaction to proceed in the binder layer.

EXAMPLE 8

Example 7 was repeated using cetyl isooctanoate instead of isostearyl myristate thereby obtaining magnetic tapes for video recording.

COMPARATIVE EXAMPLE 1

Example 1 was repeated using isostearyl stearate instead of isostearyl caproate thereby obtaining magnetic tape for video recording.

COMPARATIVE EXAMPLE 2

Example 6 was repeated using triolein instead of cetyl isooctanoate thereby obtaining magnetic tapes for video recording.

All or part of the magnetic tapes obtained in the above-described Examples and Comparative Examples were measured to determine still picture characteristics and coefficient of kinetic friction. Some tapes were checked as to whether the lubricant exuded on the surface or not. In addition, the stickiness of several types of the magnetic tapes were visually observed.

The still picture characteristics were determined as follows: a magnetic tape was set in a video magnetic recorder and reproducing device and subjected to a reproduction in a still picture state, where the reproducing head alone was moved relative to the tape, for 60 minutes to measure a lowering of the reproducing output level.

The test results are shown in Table 1 below.

head. In an extremely case, the magnetic layer will be stripped off and the head clogging will be caused.

In general, the still picture characteristics as required for the magnetic tape which can stand use in practical application are considered as follows: When the magnetic tape is subjected to a still picture reproduction operation for 60 minutes, the lowering of reproduction output level should be below −6 dB. In this sense, the

TABLE 1

| | amount of ester parts by weight (% by weight based on the binder) | Within the Range of Invention | | | | | Outside the Range of Invention | |
|---|---|---|---|---|---|---|---|---|
| | | 0 (0) | 0.1 (0.5%) | 0.2 (1%) | 1 (5%) | 2 (10%) | 4 (20%) | 5 (25%) | 6 (30%) |
| Example 1 | Lowering of reproduction output level (dB) | −20 | −5.6 | — | — | −2.3 | — | — | — |
| Example 2 | Lowering of reproduction output level (dB) | −20 | −5.7 | — | — | −2.0 | — | — | — |
| Example 3 | Lowering of reproduction output level (dB) | −20 | −5.8 | — | — | −1.6 | — | — | — |
| Example 4 | Lowering of reproduction output level (dB) | −20 | −5.6 | — | — | −1.3 | — | — | — |
| Example 5 | Lowering of reproduction output level (dB) | −20 | −5.8 | −4.2 | −1.8 | −1.4 | −3.5 | — | — |
| | Exudation of Lubricant | | nil | nil | nil | nil | nil | slight | heavy |
| | Stickiness | | no | no | no | no | no | — | yes |
| Example 6 | Lowering of reproduction output level (dB) | −20 | −5.8 | — | −2.3 | −2.0 | −2.1 | −2.8 | — |
| | Stickiness | no | no | — | no | no | no | slight | — |
| | Coefficient of kinetic friction | 0.55 | 0.30 | — | 0.20 | 0.21 | 0.30 | 0.44 | — |
| Example 7 | Lowering of reproduction output level (dB) | −12 | −4.5 | — | −1.2 | −1.1 | −2.4 | — | — |
| | Stickiness | no | no | — | no | no | slight | yes | — |
| Example 8 | Lowering of reproduction output level (dB) | −12 | −4.5 | — | −1.1 | −0.7 | −1.3 | −2.0 | — |
| | Stickiness | no | no | — | no | no | no | slight | — |
| Comparative Example 1 | Lowering of reproduction output level (dB) | — | — | — | −4.5 | — | — | — | — |
| | Exudation of lubricant | — | yes | — | yes | — | — | — | — |
| Comparative Example 2 | Lowering of reproduction output level (dB) | — | — | — | — | −1.4 | — | — | — |
| | Stickiness | — | — | — | — | slight | — | — | — |
| | Coefficient of kinetic friction | — | — | — | — | 0.30 | — | — | — |

The still picture characteristics of a magnetic tape for video recording are one of important characteristics which are closely related to the surface lubricating property of the tape. When the surface lubricating property is poor, the reproduction output level will be lowered to a considerable extent and the magnetic layer will suffer greatly from abrasions on the surface thereof produced as a result of the running operation of the magnetic tapes obtained in Examples 1 to 8 using the various types of the esters as the lubricant in amounts ranging from 0.5 to 20 wt% of the binder will be found, from the results shown in Table 1, to satisfy the above-mentioned requirement. When exceeding 20 wt% of the binder, it was found that the lubricant component oozed out from the magnetic layer to a considerable extent, rendering the surface layer sticky with a loss of the lubricating effect.

The magnetic recording media imparted with good lubricating property show small abrasion resistance against the recording or reproducing head or other contacting portions and ensure smooth operation of running, by which the abrasion of the head will be reduced.

To estimate the lubricating effect of the tapes of the foregoing examples, the abrasion loss of head was determined with the tapes of Examples 1 to 5 together with tapes for comparative purpose using no lubricant and the lubricants in an amount of 30 wt% of the binder and also with the tapes of Comparative Example 1. As a result, it was found that the tapes of Examples of the Invention showed the head abrasion loss as small as ⅜-1/6 times those for the comparative purpose.

As for cetyl isooctanoate, the excellency of this lubricant will be understood from the results of Table 1. That is, it is usually considered desirable that the coefficient of kinetic friction of magnetic recording media is smaller than 0.3. The magnetic recording media using the cetyl isooctanoate in amounts ranging from 0.5 to 20 wt% of the binder were found to have a coefficient of kinetic friction of 0.3 or smaller, with a lowering of reproduction output level being in a satisfactory range. Further, when the magnetic tapes of Example 6 were subjected to the still picture reproduction operation to observe a degree of abrasion on the magnetic layer surface and to determine an abrasion loss of the head, media for comparative purpose using no cetyl isooctanoate, 25 wt% of cetyl isooctanoate based on the binder, and those of Comparative Example 2 were all observed to bear an abrasion on the surface thereof produced by the moving head. Especially when no cetyl isooctanoate was added, the magnetic layer surface was heavily abraded and was partially stripped off. In contrast thereto, the media using cetyl isooctanoate in an amount of 0.5 to 20 wt% of the binder were substantially free of abrasion defects. As for the abrasion loss of head, the media produced according to the invention were ⅛ to 1/5 times as small as those for the comparative purpose mentioned above.

EXAMPLE 9

| | |
|---|---|
| Co-Fe$_3$O$_4$ | 100 parts by weight |
| Binder composed of a mixture of vinyl chloride-vinyl acetate copolymer, polyurethane elastomer and nitrile rubber | 20 parts by weight |
| Dispersant of soybean lecithin | 1 part by weight |
| Mixed solvent of methyl ethyl ketone, methyl isobutyl ketone and toluene | 250 parts by weight |
| Lubricant composed of a mixture of isostearyl caproate and triolein | different amount below 5 parts by weight |

The compositions of the above formulations using different amounts of the lubricant within and outside of the range of the invention were each used to make magnetic video recording tape in the same manner as in Example 1.

EXAMPLE 10

Example 9 was repeated using isostearyl myristate instead of isostearyl caproate thereby obtaining magnetic tapes for video recording.

EXAMPLE 11

Example 9 was repeated using cetyl isooctanoate instead of isostearyl caproate thereby obtaining magnetic tapes for video recording.

The tapes obtained in Examples 9 to 11 were subjected to the still picture reproduction operation in a manner described hereinbefore to determine the lowering of reproduction output level. The results are shown in Tables 2, 3 and 4 together with stickiness and head clogging tendency.

TABLE 2

| Parts by weight (% by weight based on the binder) | Within the range of Invention | | | Outside of the range of Invention | | | | |
|---|---|---|---|---|---|---|---|---|
| | T*:0.1(0.5%) IC:0.1(0.5%) | T:1(5%) IC:(5%) | T:2(10%) IC:2(10%) | T:1(5%) IC:4(20%) | T:2(10%) IC:3(15%) | T:3(15%) IC:1(5%) | T:3(15%) IC:1.6(8%) | T:3.6(18%) IC:1(5%) |
| Lowering of reproduction output level (dB) | −5.5 | −2.0 | −1.8 | −2.8 | −1.2 | −2.8 | −20 | −20 |
| Stickiness | no | no | no | yes | slight | slight | yes | yes |
| Head-clogging tendency | no | no | no | no | no | no | yes | yes |

L6 *Note:
T ... triolein
IC ... isostearyl caproate

TABLE 3

| Parts by weight (% by weight based on the binder) | Within the range of Invention | | | Outside of the range of Invention | | | | |
|---|---|---|---|---|---|---|---|---|
| | T*:0.1(0.5%) IM:0.1(0.5%) | T:1(5%) IM:1(5%) | T:2(10%) IM:2(10%) | T:1(5%) IM:4(20%) | T:2(10%) IM:3(15%) | T:3(15%) IM:1(5%) | T:3(15%) IM:1.6(8%) | T:3.6(18%) IM:1(5%) |
| Lowering of reproduction output level (dB) | −5.2 | −1.0 | −1.2 | −2.5 | −1.2 | −1.8 | −20 | −20 |
| Stickiness | no | no | no | yes | slight | slight | yes | yes |
| Head-clogging | | | | | | | | |

TABLE 3-continued

| Parts by weight (% by weight based on the binder) | Within the range of Invention | | | Outside of the range of Invention | | | | |
|---|---|---|---|---|---|---|---|---|
| | T*:0.1(0.5%) IM:0.1(0.5%) | T:1(5%) IM:1(5%) | T:2(10%) IM:2(10%) | T:1(5%) IM:4(20%) | T:2(10%) IM:3(15%) | T:3(15%) IM:1(5%) | T:3(15%) IM:1.6(8%) | T:3.6(18%) IM:1(5%) |
| tendency | no | no | no | no | no | no | yes | yes |

*Note:
T ... triolein
IC ... isostearyl myristate

TABLE 4

| Parts by weight (% by weight based on binder) | Within the range of Invention | | | Outside of the range of Invention | | | | |
|---|---|---|---|---|---|---|---|---|
| | T*:0.1(0.5%) CIO:0.1(0.5%) | T:1(5%) CIO:1(5%) | T:2(10%) CIO:2(10%) | T:1(5%) CIO:4(20%) | T:2(10%) CIO:3(15%) | T:3(15%) CIO:1(5%) | T:3(15%) CIO:1.6(8%) | T:3.6(18%) CIO:1(5%) |
| Lowering of reproduction output level (dB) | −4.2 | −0.8 | −1.0 | −1.2 | −1.1 | −1.2 | −12 | −20 |
| Stickiness | no | no | no | slight | slight | slight | yes | yes |
| Head-Clogging tendency | no | no | no | no | no | no | slight | yes |
| Coefficient of kinetic friction | — | 0.18 | — | — | — | — | — | — |

*Note:
T ... triolein
CIO ... cetyl isooctanoate

As will be understood from the above results, the recording media using the mixtures of the esters and triolein are excellent in lowering of reproduction output level and free of stickiness and head-clogging tendency when the triolein is used in amount of 0.5 to 10 wt% of the binder and the mixture is used in an amount of 1 to 20 wt% of the binder.

When the esters of isostearyl alcohol and the monobasic fatty acids were employed singly, the recording media in some cases underwent the stick-slip phenomenon, causing the picture to fluctuate. However, any such phenomenon did not occur when triolein was added to the esters. Further, as will be seen from the comparison between the results of Examples 6 and 11 and Comparative Example 2, the coefficient of kinetic friction became smaller with the mixed lubricant of triolein and cetyl isooctanoate than with the case where triolein or cetyl isooctanoate was used singly.

In addition, these mixed lubricants were also found to show an improved abrasion loss of head. These excellent results are considered to be produced from the synergistic effect of the two lubricant components.

What is claimed is:

1. A magnetic recording composition comprising, in solvent, 15 to 90 wt% of a magnetic powder, correspondingly 35 to 10 wt% of a resinous binder, and a lubricant selected from the group consisting of an ester of isostearyl alcohol and a monobasic fatty acid having 6 to 16 carbon atoms and cetyl isooctanoate, the lubricant being contained in an amount of 0.5 to 20 wt% of the binder.

2. A magnetic recording composition according to claim 1, wherein the amount is in the range of 5 to 10 wt% of the binder.

3. A magnetic recording composition according to claim 1, wherein said lubricant is cetyl isooctanoate.

4. A magnetic recording composition according to claim 1, wherein said lubricant is isostearyl caprylate.

5. A magnetic recording composition according to claim 1, wherein said lubricant is isostearyl caproate.

6. A magnetic recording composition according to claim 1, wherein said lubricant is isostearyl laurate.

7. A magnetic recording composition according to claim 1, wherein said lubricant is isostearyl palmitate.

8. A magnetic recording composition according to claim 1, wherein said lubricant is isostearyl myristate.

9. A magnetic recording composition according to claim 1, wherein said lubricant is an ester of isostearyl alcohol and a monobasic fatty acid having 12 to 16 carbon atoms.

10. A magnetic recording composition comprising, in solvent, 15 to 90 wt% of a magnetic powder, correspondingly 35 to 10 wt% of a resinous binder, and a lubricant selected from the group consisting of an ester of isostearyl alcohol and a monobasic fatty acid having 6 to 16 carbon atoms and cetyl isooctanoate, the lubricant being contained in an amount of 0.5 to 20 wt% of the binder; said magnetic recording composition further comprising triolein as another lubricant component in an amount of 0.5 to 10 wt% of said binder, the total amount of the mixed lubricant being in the range of 1.0 to 20 wt% of said binder.

11. A magnetic recording composition according to claim 10, wherein the mixed lubricant is a mixture of cetyl isooctanoate and triolein.

12. A magnetic recording composition according to claim 10, wherein the mixed lubricant is a mixture of isostearyl caproate and triolein.

13. A magnetic recording composition according to claim 10, wherein the mixed lubricant is a mixture of isostearyl myristate and triolein.

* * * * *